US007122146B2

(12) United States Patent
Akopyan

(10) Patent No.: US 7,122,146 B2
(45) Date of Patent: Oct. 17, 2006

(54) INJECTION MOLDING OF POLYMERS BY MICROWAVE HEATING

(76) Inventor: Razmik L. Akopyan, 15421 W. 128th St., Olathe, KS (US) 66062

( * ) Notice: Subject to any disclaimer, the term of this patent is extended or adjusted under 35 U.S.C. 154(b) by 0 days.

(21) Appl. No.: 11/108,523

(22) Filed: Apr. 18, 2005

(65) Prior Publication Data

US 2005/0184434 A1 Aug. 25, 2005

Related U.S. Application Data

(63) Continuation-in-part of application No. 10/868,574, filed on Jun. 15, 2004, which is a continuation-in-part of application No. 10/435,315, filed on May 9, 2003, and a continuation-in-part of application No. 10/157,324, filed on May 29, 2002, now Pat. No. 6,984,352.

(51) Int. Cl.
*B29C 45/46* (2006.01)
*B29C 45/00* (2006.01)
(52) U.S. Cl. .................. 264/478; 264/489; 425/174
(58) Field of Classification Search ........... 264/484, 264/474, 489, 478; 425/174–174.8 E
See application file for complete search history.

(56) References Cited

U.S. PATENT DOCUMENTS

| | | | |
|---|---|---|---|
| 2,262,428 A | 11/1941 | Bosomworth |
| 2,407,833 A | 9/1946 | Jablonsky et al. |
| 2,421,096 A | 5/1947 | Vogt |
| 2,421,097 A | 5/1947 | Lasko |
| 2,438,952 A | 4/1948 | Te Grotenhuis |
| 2,595,502 A | 5/1952 | Aicher et al. |
| 2,754,546 A | 7/1956 | Mason et al. |
| 3,294,879 A | 12/1966 | Jacobs |
| 3,475,522 A | 10/1969 | Garibian et al. |
| 3,519,517 A | 7/1970 | Dench |
| 3,777,099 A | 12/1973 | Levinson |
| 3,851,131 A | 11/1974 | Johnston et al. |
| 4,110,139 A | 8/1978 | Mashida |
| 4,129,768 A | 12/1978 | Anderson |
| 4,268,238 A | 5/1981 | Marc |
| 4,269,581 A | 5/1981 | Ury et al. |
| 4,298,324 A | 11/1981 | Soulier |

(Continued)

FOREIGN PATENT DOCUMENTS

DE 19818605 * 12/1999

OTHER PUBLICATIONS

S. Havriliak, Jr and S. Havriliak; "Dielectric and mechanical relaxation in materials"; Hanser Publishers, Munich, Vienna, New York, 1997, pp. 1-9.

*Primary Examiner*—Jill L. Heitbrink
(74) *Attorney, Agent, or Firm*—Erickson & Kleypas, L.L.C.

(57) ABSTRACT

Injection molding machine utilizes microwave heating. A microwave oven adapted to receive a microwave absorbent plasticizing vessel is utilized with or incorporated into an injection molding system to form a plasticizing unit for heating polymer granules to an injection temperature and injection of the melt into the cavity of the injection mold. The polymer granules may be preheated by conventional heating systems to a temperature at which the granules become microwave absorbent before heating to the injection temperature in the microwave oven. The injection molding machine also contains a hydraulic actuator for injection of the melt. The ceramic materials forming the plasticizing vessel are selected to provide equal heating rates of mold members and relatively uniform heating of polymer to desired injection temperature.

18 Claims, 8 Drawing Sheets

U.S. PATENT DOCUMENTS

| | | |
|---|---|---|
| 4,307,277 A | 12/1981 | Maeda et al. |
| 4,323,745 A | 4/1982 | Berggren |
| 4,441,876 A | 4/1984 | Marc |
| 4,454,403 A | 6/1984 | Teich et al. |
| 4,456,806 A | 6/1984 | Arimatsu |
| 4,466,938 A | 8/1984 | Gigl et al. |
| 4,477,707 A | 10/1984 | Kim |
| 4,481,159 A | 11/1984 | Itoh |
| 4,524,037 A | 6/1985 | Marc |
| 4,558,198 A | 12/1985 | Levendusky et al. |
| 4,597,922 A | 7/1986 | Durbin |
| 4,600,375 A | 7/1986 | Honsho et al. |
| 4,617,439 A | 10/1986 | Lespinats et al. |
| 4,760,228 A * | 7/1988 | Kudo .................. 219/686 |
| 4,810,846 A | 3/1989 | Holcombe et al. |
| 4,851,167 A | 7/1989 | Marc |
| 4,880,578 A | 11/1989 | Holcombe et al. |
| 4,939,330 A | 7/1990 | Berggren et al. |
| 4,940,870 A | 7/1990 | Shibata et al. |
| 4,963,709 A | 10/1990 | Kimrey, Jr. |
| 5,082,436 A | 1/1992 | Choi et al. |
| 5,139,407 A | 8/1992 | Kim et al. |
| 5,166,484 A | 11/1992 | Young et al. |
| 5,202,541 A | 4/1993 | Patterson et al. |
| 5,258,596 A | 11/1993 | Fabish et al. |
| 5,290,490 A | 3/1994 | Nied et al. |
| 5,321,222 A | 6/1994 | Bible et al. |
| 5,406,058 A | 4/1995 | Lipp |
| 5,420,404 A | 5/1995 | Goodman et al. |
| 5,466,144 A | 11/1995 | Adams et al. |
| 5,521,360 A | 5/1996 | Johnson et al. |
| 5,593,610 A | 1/1997 | Minerich et al. |
| 5,607,612 A | 3/1997 | Held et al. |
| 5,639,518 A | 6/1997 | Ando et al. |
| 5,653,778 A | 8/1997 | Rutjes et al. |
| 5,659,972 A | 8/1997 | Min et al. |
| 5,762,972 A | 6/1998 | Byon |
| 5,804,801 A | 9/1998 | Lauf et al. |
| 5,811,769 A | 9/1998 | Schiffmann et al. |
| 5,813,134 A | 9/1998 | Min et al. |
| 5,844,217 A * | 12/1998 | Hawley et al. .............. 219/762 |
| 5,902,510 A | 5/1999 | Balbaa et al. |
| 5,961,871 A | 10/1999 | Bible et al. |
| 6,034,363 A | 3/2000 | Barmatz et al. |
| 6,241,929 B1 | 6/2001 | Akopyan |
| 6,365,885 B1 | 4/2002 | Roy et al. |
| 6,486,455 B1 | 11/2002 | Merabet |
| 6,512,216 B1 | 1/2003 | Gedevanishvili et al. |

* cited by examiner

INJECTION MOLDING OF POLYMERS BY MICROWAVE HEATING

CROSS-REFERENCE TO RELATED APPLICATION

This U.S. Patent application is a continuation in part of and claims the benefit under 35 U.S.C. 120 of the filing date of U.S. patent application Ser. Nos. 10/157,324 filed May 29, 2002, now U.S. Pat. No 6,984,352 Ser. No. 10/435,315 filed May 9, 2003 and U.S. patent application Ser. No. 10/868,574 filed Jun. 15, 2004.

BACKGROUND OF THE INVENTION

This invention relates to the injection molding of engineered thermoplastics including fiber reinforced plastics which perform at extremely high temperatures and stresses. The processes and apparatus disclosed herein may also be utilized for injection molding of thermosets.

In previously filed patent applications, including application Ser. No. 10/868,574 entitled Microwave Molding of Polymers, Publication No. US-2004-0222554-A1, and application Ser. No. 10/435,315 entitled Microwave Molding of Polymers, Publication No. US-2003-0224028-A1, I disclosed methods for creating compression molds for use in the compression molding of polymers using microwave energy to heat the polymer to its melting point. The molds and processes disclosed therein are particularly well adapted for molding plastic polymers and composites having a relatively high operating temperature, including such high performance polymers as those sold under the trademarks PEEK®, TORLON®, SEMITRON®, DURATRON®, CELAZOLE®. The use of microwave energy to heat the polymer in the compression molds disclosed therein will result in significant energy savings compared to molding processes using electric, gas or steam heating to heat the polymer to its melting point.

Using the molds formed in the manner disclosed in my prior applications, rapid and uniform heating of thermoplastic and thermoset materials by microwave energy may be achieved due to the volumetric nature of microwave (MW) heating. Polymer material in powder or pellet form is compacted within a mold cavity of the mold assembly which is placed into the resonance cavity of a multimode microwave oven and exposed to microwave radiation. Upon reaching the desired temperature at which the polymer material melts or softened, the mold halves are squeezed together by a hydraulic press to mold the molten polymer into desired shape. The mold is then allowed to cool until the molded polymer solidifies and retains its molded shape. The mold is designed to provide relatively uniform heating of polymer material due to approximately equal heating rates of all of the mold members and polymer or work material resulting in relatively uniform heating of the polymer.

It is believed that the compression molding techniques using microwave energy described in my prior published patent applications provide higher quality finished products, shorter processing times by a factor of approximately 10 or more, and reduced consumption of energy by the same factor. Nevertheless, in spite of significant advantages, microwave compression molding has drawbacks. For example, parts formed from compressed pellets or powders usually have lower mechanical properties than injection molded parts. Also grinding pellets to a fine powder results in increased material and handling costs. Although the use of pellets avoids the additional cost associated with grinding the pellets into fine powder, compression molding of pellets can result in finished product showing visible borders at the interfaces between molten granules. This may be explained by the rheological properties of molten pellets and by the absence of mixing and dispersing mechanisms to obtain homogeneity of the melt. In addition, if the microwave compression molding process is not performed with adequate compression or compaction of the pellets, the resulting product can also have undesirable voids or pores.

Injection molding of plastics from pellets has been widely and effectively used in the plastic industry for decades. In a conventional injection molding machine 1, shown in FIG. 1, a screw 2 rotates in heated barrel 3 in order to melt and inject the plastic material into the mold cavity 4 of mold 5. Pellets of polymer material supplied from hopper 6 into barrel 3 are plasticized by the heat transfer from external heaters 7 through barrel 3 and the heat created by the shear forces generated from rotation of the screw 2 against the pellets in the barrel 3. The molten polymer is forced toward the front of the barrel 3 by the action of the screw 2 such that the molten polymer is forced out of the barrel 3 and injected into the mold cavity 4. Another general type of plasticizing unit is a plunger type plasticizing unit 10 shown in FIG. 2. The plunger type plasticizing unit 10 uses external heaters 11 mounted on the barrel 12 to heat and melt the polymer pellets which are fed into the barrel through hopper 13. Instead of a screw, the plunger type plasticizing unit 10 uses a plunger 14 to force the palletized polymer toward the front of the barrel 12. A torpedo shaped baffle or diverter 15 is positioned in the barrel 12 near the front end thereof which forces the pelletized polymer feed through a relatively thin section to ensure melting of the polymer prior to injection out of a nozzle 16 at the front of the barrel 12 and into mold cavity 17 of mold 18.

At the present time there exist numerous variations of screw and plunger type plasticizing units for injection molding. These injection molding machines utilize conventional heat transfer from the external heaters through the barrel to melt the plastic material in the barrel. Because of their molecular structure, plastics have low thermal conductivities; thus it is difficult to rapidly transmit heat through the polymers by conduction. Known plasticizing units for injection molds therefore incorporate long screws and barrels to increase the internal heating surface area and travel time to allow the polymer to melt prior to injection from the plasticizing unit into the mold.

Due to the low thermal conductivity of plastics, the ratio of the volume of the material injected out of the plasticizing unit to the heating surface area of the plasticizing unit per cycle is relatively small and therefore inefficient. It would be desirable to find a means for significantly increasing the efficiency of heating the pelletized plastic without increasing the size of the plasticizing unit. However, increasing the shot capacity by accumulation of molten plastic in the rear zone of plasticizing unit may cause plastic degradation due to prolonged heating and is not desirable.

Although the use of microwave heating of plastics in a plasticizing unit of an injection molding machine might seem attractive, only a few types of thermoplastics may be effectively heated from room temperature by microwave energy. Conversely, conventional heating techniques employed in current injection molding processes, including electric and steam heating, are capable of processing almost all types of polymers.

The dielectric properties of polymers and their coupling with microwaves are directly related to their molecular structure. Polymers are generally nonpolar, having very regular structures and, therefore, low molecular polarity, so that they exhibit practically no dielectric loss. The negligible dielectric loss of most plastics is the reason why plastic containers do not heat up due to exposure to microwave energy when used to contain items heated in a microwave oven. In contrast to plastics, water molecules have a high polarity which makes water an ideal material for microwave heating and which permits drying of polymers with microwave energy prior to molding. Any water absorbed by the polymers will be heated by the microwave energy and evaporated in a short period of time. After the water has dried out, the polymer will exhibit a true value for its dissipation factor, $\tan\delta$, which is the measure of polymer's ability to absorb the microwave radiation. As discussed above, for many polymers the dielectric losses are not sufficient to permit raising of the polymer's temperature from room or ambient temperatures to its melting or softening temperature through microwave heating.

Most of the modern high performance engineering plastics, discussed above, have low or moderate values for their dissipation factors, $\tan\delta$. Therefore, microwave processing of such polymers is generally considered impractical, especially for polymers containing glass fillers.

A variety of conveyer belt or drum type systems are available for microwave drying of polymers which may be used to feed an injection molding machine with dry polymer pellets. However, none of these known prior art microwave drying systems are adapted for use in melting or plasticizing the plastic material as part of an injection molding system.

There remains a need in injection molding systems which allow for the rapid and uniform heating of high performance engineered plastics with relatively high operating temperatures.

SUMMARY OF THE INVENTION

The present invention comprises an injection molding system and process utilizing microwave energy to melt or plasticize the plastic material including fiber reinforced plastics or plastics or polymers whose properties have been enhanced through the addition of various additives or the like. As used herein, the terms plastic and polymer are intended to include these engineered materials in which reinforcing fibers or other additives have been added to enhance the properties of the material to be molded.

Amorphous and crystalline plastics behave differently during their heating. When amorphous plastic is heated to an injection or process temperature, it softens gradually from rigid to rubbery to a liquid state suitable for injection. For this reason amorphous plastics are characterized by glass transition temperature, $T_g$. By contrast, when a crystalline plastic is heated, it remains solid until it reaches its melting point. At that point it changes suddenly from a crystalline solid to a molten liquid and becomes amorphous. The process temperature is usually higher than the melting point of crystalline plastics and higher than the glass transition temperature, $T_g$, of amorphous plastics. For simplicity, hereafter for all plastics we will use the definitions of process or injection temperature as the temperature at which plastic becomes semi-liquid with a viscosity suitable for injection. The recommended process temperature or injection temperature is typically given in the specification of each thermoplastic material provided by the supplier. As used herein, the word "melt" or "molten" refers to semi-liquid state of the plastic at the process or injection temperature.

The injection molding system includes a mold with a mold cavity for shaping injected work material, a plasticizing vessel in which a selected quantity of granulated plastic work material is melted, a microwave oven in which the plasticizing vessel is exposed to microwave energy to melt the plastic work material and an injection assembly for compressing the plastic work material prior to microwave heating and for ejecting the molten work material from the plasticizing unit into the injection mold cavity. The plasticizing vessel, which may also be referred to as a heating mold, is adapted to permit compaction of the plastic work material prior to heating by microwave energy. The microwave oven may be incorporated into the injection assembly or may be provided as a separate unit.

The plasticizing vessel is formed from a hollow metal cylinder surrounded by a layer of ceramic microwave absorbing material and an outer layer of thermal insulation. The hollow metal cylinder surrounds or defines a plasticizing cavity which is closed off at a first end by a first end wall. A plurality of relatively small outlet openings or holes for dispersing and mixing of the melt is formed in the first end member in communication with a nozzle connected to the first end wall. A plunger is advanceable through an inlet opening in a second end of the plasticizing vessel toward and away from the first end wall. The plunger and the first end wall are preferably formed from microwave absorbing ceramic material. The nozzle may be permanently or removably attached to the first end wall. The nozzle preferably includes at least one multi-hole dispenser for dispersing and mixing of the molten work material discharged therethrough.

Prior to placement in the plasticizing vessel, plastic pellets or granules are preferably preheated by conventional heating means, such as by conduction or forced air heating. The granules are preferably preheated to a critical temperature at which the plastic becomes microwave absorbent, wherein the dissipation factor $\tan\delta$ exceeds 0.01–0.02. The granules may also be heated to the heat deflection temperature defined under 264 psi of stress at which the plastic becomes pliable but does not yet become a liquid. For many plastics, the heat deflection temperature typically exceeds the critical temperature (the temperature at which the polymer becomes microwave absorbent).

In a preferred embodiment, the pellets are compacted prior to heating by microwave energy to increase the efficiency of such microwave heating. Preheating and compaction of the pellets provides significant improvement of the molding process for the following reasons:

compaction of the pellets in the plasticizing vessel allows more plastic material to be processed in the same volume of the vessel, compaction of the pellets in the heating vessel significantly increases surface contact area between the pellets and reduces the amount of air trapped therebetween and, thus, increases thermal conductivity of the compacted pellets, which improves heat flow through the compacted pellets resulting in shortening of the time required for equalization of temperature therethrough, preheating of the pellets to the heat deflection temperature followed by compaction of the pellets significantly improves the coupling of microwave energy with the work material and therefore allows microwave heating of plastics having low dielectric losses at room temperature.

A hydraulic actuator of the injection assembly press may be utilized for compaction of the polymer granules prior to microwave heating and ejection of the molten plastic into the mold after microwave heating of the plastic. If the microwave oven is incorporated into the injection assembly, an opening through a wall or roof of the microwave oven is provided to permit the advancement and retraction of the piston of the hydraulic actuator through the opening and into engagement with the plunger of the plasticizing unit. The added expense of incorporating a microwave oven into the injection assembly may be avoided by using a separate stand alone microwave oven for microwave heating of the plastic pellets in the plasticizing unit. However, when a stand alone unit is utilized additional apparatus or labor is required for transferring the plasticizing vessel between the injection assembly and the microwave oven. Apparatus for transferring the plasticizing vessel between the mold press and a stand alone microwave oven may include conveyor systems or robotic mechanisms.

With the plasticizing vessel positioned in the injection assembly, preheated plastic pellets are poured by gravity into the plasticizing vessel through its inlet opening. The hydraulic actuator of the injection assembly may be utilized to compact the pellets in the plasticizing unit. The plunger is removably coupled to the end of the hydraulic actuator piston of the injection assembly and then advanced through the inlet opening of the plasticizing vessel and toward the first end wall, compacting the pellets therebetween. After compaction of the pellets, the plunger is locked in place, by a locking ring or other suitable means, to maintain the pellets in the compacted state. The hydraulic actuator piston is then separated from the plunger and retracted out of the plasticizing vessel into intermediate position if the microwave oven is incorporated into the injection assembly. To increase the shot capacity, an additional amount of preheated pellets may be added into the heating vessel and compacted again. If the microwave oven is not incorporated in the injection assembly the plasticizing vessel is transferred out of the injection assembly and positioned in the resonance cavity of a separate, stand alone microwave oven.

The microwave oven is then activated, exposing the plasticizing vessel and its contents to microwave radiation within the resonance cavity of the microwave oven. Upon activation of the microwave oven, the electric field established in the resonance cavity heats both the plasticizing vessel and the plastic granules contained therein. The granules are heated by both conduction from the heated microwave absorbing mold members and by volumetric heating due to exposure to microwaves. Microwaves penetrate through the first end wall and the plunger which are formed from microwave susceptible ceramic material which also allows microwaves to pass therethrough and into the plasticizing vessel cavity and the plastic contained therein. The microwave oven may be provided with a carousel type apparatus for rotating the plasticizing vessel during microwave heating.

Once the plastic granules are heated to the plastic's injection temperature, the molten plastic is ejected out of the plasticizing vessel through the outlet openings, then through the nozzle, through a sprue in the mold and into the mold cavity. If the microwave oven in which the plasticizing vessel and its contents are heated is maintained separate from the injection assembly, the heated plasticizing vessel must first be transferred to the injection assembly. With the plasticizing vessel in the injection assembly and the nozzle engaging the mold sprue, the hydraulic actuator piston is extended to engage the plunger and then drive the plunger toward the first end wall, ejecting the molten plastic out of the plasticizing vessel cavity, through the outlet openings and the nozzle, through the sprue and into the mold cavity of the mold. The molten plastic is then cooled in the mold until the molded part solidifies. After solidification of the molded part, the hydraulic actuator piston and attached plunger are retracted out of the plasticizing vessel to open the inlet opening to the plasticizing vessel to permit filling of the plasticizing vessel with another load of preheated plastic granules for the next shot.

When the microwave oven is incorporated into the injection assembly, some measures must be taken to prevent the leakage of microwave radiation through the gaps between hydraulic piston and the wall of the microwave oven and the drive for any carousel mechanism associated therewith. Such measures include providing the gaps as small as practical and, if necessary, utilizing a quarter wavelength choke. The same measures may be taken to prevent the leakage of microwave radiation through a hole in the oven for the nozzle.

The microwave injection molding system disclosed herein may be utilized for molding relatively massive parts of relatively thick cross-section. Molding such relatively thick parts may require utilization of injection-compression molding techniques (ICM). ICM is a system in which the molten polymer is injected into a slightly opened mold. After completion of injection or during the final phase of injection, the moving platen of the mold is pressed or compressed toward the stationary platen, creating the compressive stroke. In this case, the moving mold half exerts pressure directly against the solidifying plastic resin. By using ICM, the injection pressure can be reduced and the ratio between flow length and wall thickness also improves. During the holding pressure phase, the material is not subject to any shear stress, so the molded products exhibit little orientation and little tendency to warp.

In order to provide rapid heating and cooling of the injection mold cavity, the mold members include mold plates or mold cavity plates defining the interior mold cavity and having interior channels for receiving heating and cooling elements or medium. The mold plates are thermally insulated from the rest of the mold assembly by a layer of rigid thermal insulation. The mass of these plates is significantly smaller than the total mass of the mold. Insulating the mold cavity plates from the rest of the mold assembly allows for relatively rapid preheating of the mold cavity plates to the desired temperature prior to injection of the mold material and rapid cooling upon completion of the injection of molten polymer.

The materials used to form the microwave absorbing layers of the plasticizing vessel are created by adding selected materials or additives to a base mold material, such as a ceramic base mold materials as described in my U.S. patent application Ser. No. 10/868,574.

Based upon experiments conducted in developing the injection molding process disclosed herein, high-performance engineering thermoplastics with low dielectric losses at room temperature may be effectively coupled with or heated by microwave radiation if they are preheated by conventional means to or above the critical temperature which is usually lower than or approaching the heat deflection temperature of the thermoplastic material. An example of conventional preheating means comprises an electric oven with circulating hot air.

At elevated temperatures, the dissipation factor for these polymers significantly increases making the polymers dielectrically conductive and enabling absorbtion of microwave energy. Both conventional and microwave molding techniques require drying of raw materials at elevated temperatures prior to molding. If the plastic material is exposed to microwave radiation immediately after preheating and drying when the temperature of the plastic pellets exceeds the critical temperature (the temperature at which the polymer becomes microwave absorbent or susceptible), then the advantages of microwave heating can be obtained even for polymers with very low dielectric losses at room temperature.

DETAILED DESCRIPTION OF THE INVENTION

Figure 1:
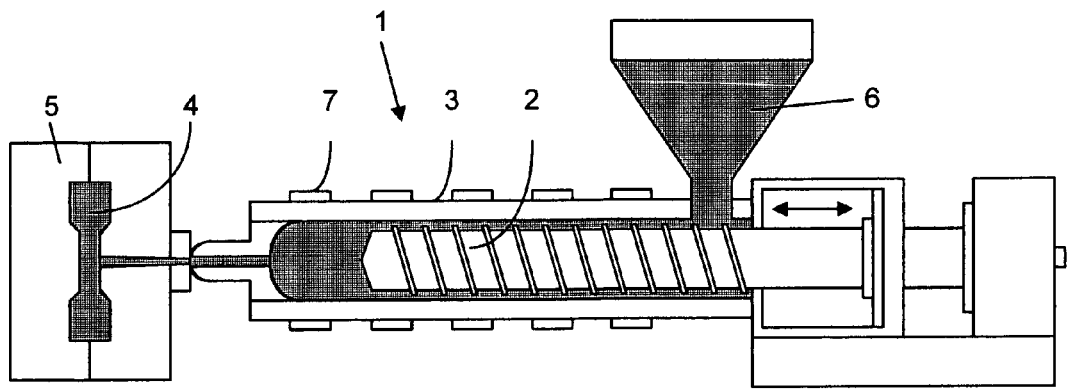
FIG. 1 is a schematic view of a conventional screw type injection molding machine.
Figure 2:
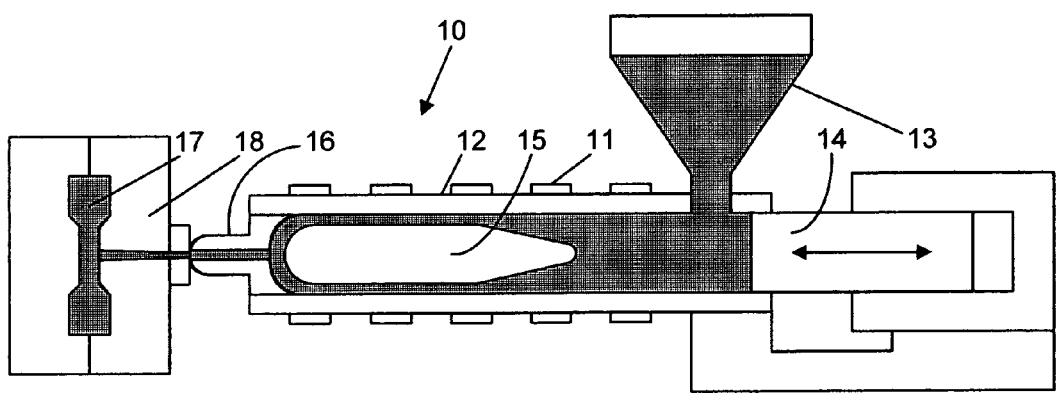
FIG. 2 is a schematic view of a conventional plunger type injection molding machine.
Figure 3:
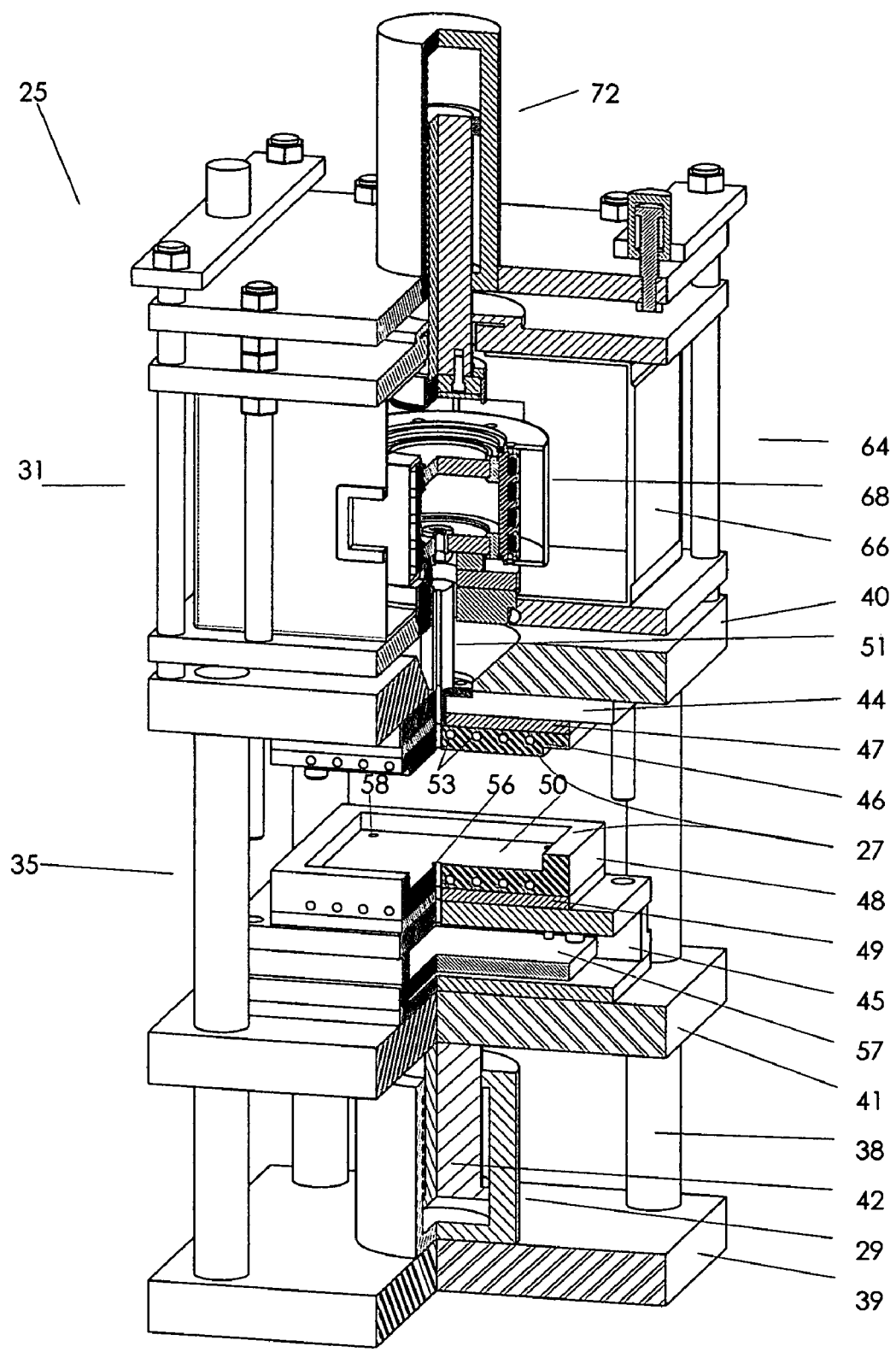
FIG. 3 is a perspective view of an injection molding machine of the present invention having a microwave oven integrated into the plasticizing unit and with portions removed to show detail therein.

Referring to the drawings in more detail, one embodiment of a microwave injection molding system 25 of the present invention is shown in FIG. 3. The injection molding system 25 comprises an injection mold 27, a mold clamping press 29 for opening and closing the mold 27, a plasticizing unit 31 in which plastic granules are received and heated to their melting point and an injection assembly 33 for ejecting molten plastic out of the plasticizing unit 31 and into the mold 27. In the embodiment shown in FIG. 3, the foregoing components are all mounted or adapted to be supported on a frame 35.

The injection mold 27 and mold clamping press 29 are generally of conventional design. Referring to FIG. 3, the mold 27 shown for illustrative purposes, is shaped for molding rectangular shaped parts. It is to be understood that the mold may be designed or shaped to mold parts of various shapes and dimensions. The mold press 29 comprises a first set of tie bars 38 which are fixedly connected to and extend upward from a base plate 39 to a stationary platen 40. A moveable platen 41 is slidably mounted on the tie bars 38 between the base plate 39 and the stationary platen 40. A mold clamping press actuator 42 is coupled to and operable to move the moveable platen 41 toward and away from the stationary platen 40.

A first or upper mold half 44 is removably securable to the stationary platen 40 and a second or lower mold half 45 is removably securable to the moveable platen 41. The upper mold half 44 includes a first or upper mold member or mold core plate 46 and a layer of insulation 47 which separates the mold core plate 46 from the rest of the upper mold half 44. The lower mold half 45 includes a second or lower mold member or mold cavity plate 48 and a layer of insulation 49 which separates the mold cavity plate 48 from the rest of the lower mold half 45. Insulation of the mold members 46 and 48, permits efficient preheating and cooling of the mold core and cavity plates 46 and 48 during molding cycles. Silicon bonded mica plates or glass-mica plates may be used as a material for insulating layers 47 and 49. Silicon bonded mica can withstand temperatures up to 1292° F., compression pressure of up to 17,000 psi and has very low thermal conductivity.

Advancement of the moveable platen 41 toward and away from the stationary platen 40 by the actuator 42 advances the mold members 46 and 48 into and out of engagement. A mold cavity 50 is formed between the first mold member 46 and the second mold member 48 when the mold members 46 and 48 are advanced into engagement. A sprue 51 is formed in the upper mold half 44 and in a sprue bushing or sprue extension member 52 connected to and extending above the upper mold half 44. The sprue 51 generally comprises a passageway in communication with the mold cavity 50 and through which molten plastic from the plasticizing unit 31 may be injected into the mold cavity 50.

Referring again to FIG. 3, both mold members 46 and 48 contains channels 53 for receiving heating and cooling elements or agents. Electric resistance cartridge heaters may be placed in some of these channels 53 for heating the mold members 46 and 48 and precision tubes for circulation of cooling agent (for example, water) may placed in other channels 53 for cooling of plates 46 and 48 from a cooling system (not shown). A part puller 56 is incorporated into the lower mold member 48 for engaging the molded part formed in the mold cavity 50 and holding the molded part to the lower mold member 48 when it is separated from the upper mold member 46 after the part is cooled. An ejector pin assembly 57 including ejector pins 58 is incorporated into the lower mold half 45 to permit ejection of the molded part from the lower mold member 48 after separation of the mold members 46 and 48.

Figure 4:
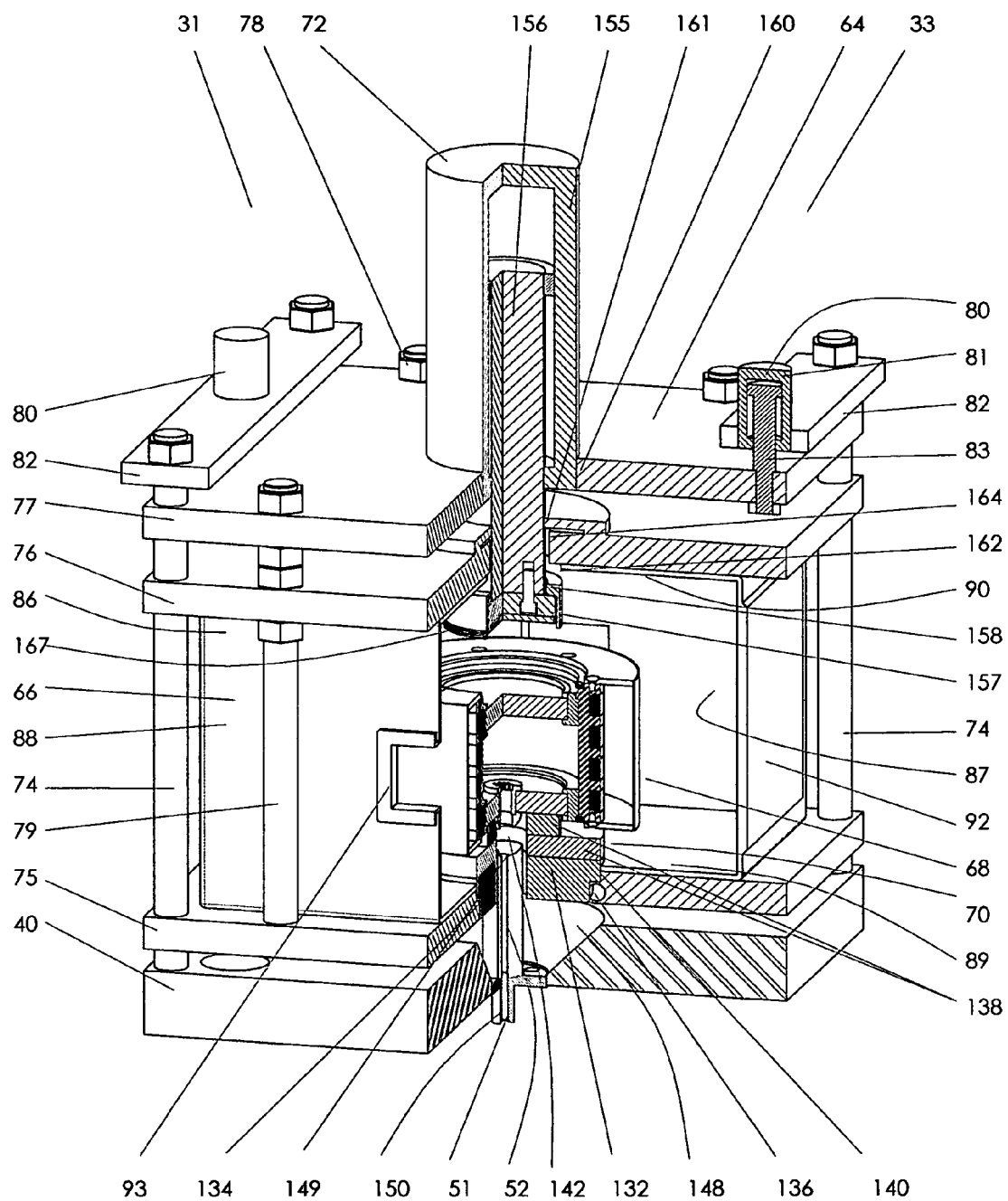
FIG. 4 is an enlarged and fragmentary view of the plasticizing unit as shown in FIG. 3 with portions removed to show detail therein.

Referring to FIG. 4, the plasticizing unit 31 of the embodiment shown in FIG. 3, includes a plasticizing unit subframe 64, a multimode microwave oven 66, a plasticizing vessel or heating mold 68, a rotary device 70 for rotating the plasticizing vessel 68 within the microwave oven 66 and a linear or injection actuator 72. The plasticizing vessel 68 is adapted to receive pellets of a plastic or polymer work material and is positioned inside of the microwave oven 66 for heating the plastic pellets to the injection temperature of the plastic. The linear actuator 72 selectively engages the plasticizing vessel 68 to compress its contents and to inject molten plastic from the plasticizing vessel 68 into the mold 27 as discussed in more detail hereafter. The linear actuator 72 and the plasticizing unit subframe 64 may generally be referred to as the injection assembly 33. The plasticizing unit subframe 64 is slidably connected to a set of rails 74 which are connected to and extend above the stationary platen 40.

The plasticizing unit subframe 64 includes a lower or inner plate 75, an intermediate plate 76 and an upper or outer plate 77. The microwave oven 66 is supported or clamped between the lower and intermediate plates 75 and 76. The injection actuator 72 for the plasticizing unit 31 is mounted on the upper plate 77 of the subframe 64. The lower, intermediate and upper plates 75, 76 and 77 are each slidably connected to the rails 74 and connected or tied together by tie rods 79 and bolts 78.

Sliding movement of the plasticizing unit subframe 64 on the rails 74 is controlled by a pair of hydraulic actuators 80. Cylinders 81 of each hydraulic actuator 80 are mounted on end plates 82 extending between opposite pairs of rails 74 above the upper plate 77 of plasticizing unit subframe 64. Pistons 83 of each actuator 80 extend through the end plates 82 and are connected to the upper plate 77 of subframe 64. Extension and retraction of pistons 83 causes the subframe 64 and the microwave oven 66 supported thereon to move toward and away from sprue bushing or sprue extension member 52 for engagement of the nozzle of heating vessel with the of injection mold 27.

The microwave oven 66 comprises a thin wall metal enclosure 86 surrounding a resonance cavity 87. The enclosure 86 includes sidewalls 88, bottom panel 89 and top panel 90. Formed in the sidewalls 88 are a door 92 and one or more launch ports 93 for directing microwaves from magnetrons (not shown) into the resonance cavity 87. The launch ports 93 may contain rotary antennas or mode stirrers (not shown) for providing relatively uniform electric field in resonance cavity 87.

Figure 5:
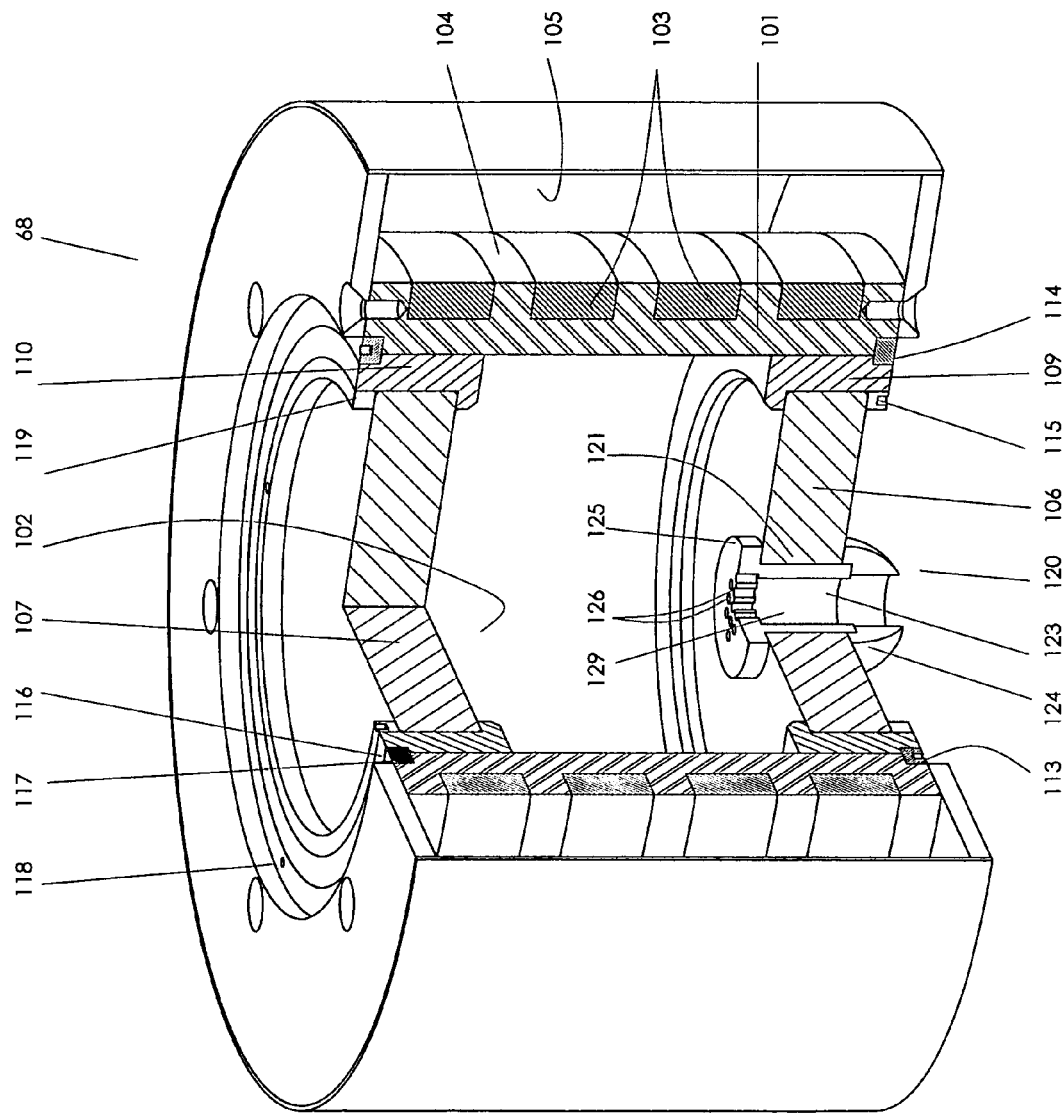
FIG. 5 is an enlarged view of a heating vessel of the plasticizing unit of the present invention with portions removed to show detail therein.

The plasticizing vessel 68, as shown in more detail in FIG. 5, comprises a cylindrical wall or metal sleeve 101 surrounding a plasticizing cavity 102 in which the plastic granules are received, compacted and heated to their injection temperature. The sleeve 101 is preferably metal and surrounded on its outer surface by a layer of microwave absorbing ceramic material 103 which may comprise a plurality of circumferential strips extending around the metal sleeve 101. The metal sleeve 101 and the layer of microwave absorbing ceramic material 103 may be collectively referred to as the plasticizing vessel sidewall 104 or circumferential sidewall 104. An insulating layer 105 is formed around the microwave absorbing layer 103 and the metal sleeve 101. The insulating layer 105, as shown in FIG. 5, may comprise a layer of air or may be made of fiber-glass mat with very low thermal conductivity or other insulators well known in the industry.

First and second plungers or endwalls 106 and 107 are removably and slidably securable within sleeve 101. With reference to the plasticizing vessel 68 as oriented in FIG. 5, the first plunger 106 is positioned below the second plunger 107 and the plungers 106 and 107 generally define the ends of the plasticizing cavity 102. The plungers 106 and 107 are preferably formed of a microwave absorbing ceramic material and are encircled by metal bushings 109 and 110 extending between the associated plunger 106 and 107 and the inner wall of sleeve 101. The bushings 109 and 110 provide tight tolerances to prevent molten plastic from leaking between the plungers 106 and 107 and the sleeve 101, but do permit the plungers 106 and 107 to slide relative to the sleeve 101.

A first lock ring 113 is removably securable to the metal sleeve 101, near a first or lower end 114 thereof to form an inwardly directed shoulder or lip which prevents the first or bottom plunger 106 and bushing 109 from sliding past or out of the lower end 114 of the sleeve 101. The first lock ring 113 may be removably secured to the metal sleeve 101 by mating threads on the outer surface of lock ring 113 and the inner surface of the lower end 114 of metal sleeve 101. One or more tool receiving openings, similar to holes 118, may be formed in the lower surface of first lock ring 113 to receive a tool for use in separating the first lock ring 113 from the metal sleeve 101. When the plasticizing vessel 68 is in use, the bushing 109 of the lower plunger 106 generally abuts and engages the first lock ring 113 proximate the first or lower end 114 of the sleeve 101. The first or lower plunger 106 may be removed from the sleeve 101 through the lower end 114 for maintenance and the like by first removing the lock ring 113. A second lock ring 115 is removably secured to an inner, lower surface of the bushing 109 to permit removal of the plunger 106 from the bushing 109 for maintenance and the like.

A third lock ring 116 is removably securable to the metal sleeve 101 near a second or upper end 117 thereof to form an inwardly directed shoulder or lip. When secured to the upper end 117 of metal sleeve 101, the third lock ring 116 prevents the second or top plunger 107 and bushing 110 from sliding out of the sleeve 101 past the upper end 117. One or more tool receiving openings, such as holes 118, may be formed in the upper surface of third lock ring 116 to receive a tool for use in separating the third lock ring 116 from the metal sleeve 101.

A fourth lock ring 119 is revovably securable to an inner surface of the second or upper bushing 110 to permit removal of the top plunger 107 from bushing 110. An inner surface of the fourth lock ring 119 is threaded to permit coupling of the injection actuator 72 to the top plunger 117 as discussed in more detail hereafter.

A nozzle 120, preferably made of a metal alloy, is mounted in a nozzle receiving hole 121 in the bottom plunger or end wall 106. The nozzle 120 generally comprises a hollow metal tube or shaft 123 with an inwardly tapered or semi-spherically curved distal end 124 and an outwardly flared inner end or flange 125. The flange 125 of nozzle 120 is wider than the nozzle receiving hole 121 and acts as a stop preventing the nozzle 120 from sliding through the hole 121. The nozzle shaft 123 extends through the hole 121 and generally extends outwardly from or below bottom plunger 106.

A flange or end wall 127 of nozzle 120 contains a plurality of outlet holes 126 in communication with an interior passageway 129 through metal tube 123 of nozzle 120. These holes 126 provide mixing and dispersing of the molten plastic as it is forced out of the plasticizing vessel 68 and through the passageway 129 of nozzle 120 and to the mold 27.

The plasticizing vessel 68 is adapted to be supported on the rotary device or turntable 70 in the microwave oven 64. The rotary device 70 is adapted for rotating the plasticizing vessel 68 within the microwave oven 66 during the heating cycle to aid in attempting to achieve a uniform temperature of the plastic working material in the plasticizing vessel 68. The rotary device or turntable 70 includes an annular gear 132 which is rotatably mounted in a bore 134 extending through the lower plate 75 of the subframe 64 which is driven by a drive element such as worm gear 136. The worm gear in turn is driven by drive means not shown, such as a motor or hand crank. The turntable further comprises one or more annular spacers138 supported upon and extending above the annular gear 132. The turntable 70 extends up into the microwave oven 64 through a turntable opening 140 formed in the bottom panel 89 of the microwave oven 66. A nozzle extension bore 142 extends through the annular gear 132 and annular spacers 138 of the turntable 70. The annular gear 132 is preferably formed from microwave reflective material (for example, metal) and the annular spacers 138 are preferably formed from a microwave transparent, heat insulating material, such as mica. The spacers 138 support the plasticizing vessel 68 above the bottom panel 89 of the microwave oven 66 to increase the transmission of radiation through the bottom plunger 106.

As discussed previously, a hollow sprue bushing or sprue extension member 52 is connected to the upper mold half 44. The sprue bushing 52 extends upward through an aperture 148 in the stationary platen 40 and into the nozzle extension bore 142. When the pistons 83 of actuators 80 are retracted pulling the plasticizing unit subframe 64 upward into a retracted or raised position, the nozzle 120 is spaced apart from and above the sprue bushing 52. When the pistons 83 of actuators 80 are extended, the subframe 64 advances downward toward the sprue bushing 52, until the nozzle 120 is advanced into engagement and flow communication with the sprue bushing 52. A semi-spherical depression 149 is formed in an upper end of the sprue bushing 52 and is sized and shaped to receive and mate with the semi-spherically shaped end of the nozzle 120. A passageway 150 is formed in the sprue bushing 52 to permit molten plastic to flow from the plasticizing vessel 68 to the mold cavity 50. The nozzle extension bore 142 is preferably sized just slightly larger than the sprue bushing 52. A quarter wavelength choke (not shown) may be formed in the turntable 70 to prevent microwave radiation from leaking through the nozzle extension bore 142 and past the turntable 70.

The injection actuator 72 generally comprises a cylinder 155, piston 156 with an enlarged head 157 at a lower or outer end thereof and an annular locking collar 158 rotatably mounted on the piston 156 above and around the head 157. The actuator cylinder 155 is mounted in a cylinder mounting hole 160 extending through the upper plate 77 of sliding subframe 64. The piston 156 extends below the upper plate 77 and through piston receiving apertures 161 and 162 formed in the intermediate plate 76 of subframe 64 and in the top panel 90 of microwave oven 66 respectively. The piston head 157 and the locking collar 158 extend into the resonance cavity 87 and are attached to the end of the piston 156 after the actuator is secured to the subframe 64 with the piston 156 extending into the resonance cavity 87.

The top panel 90 of the microwave oven 66 is positioned in contact with the subframe 64 intermediate plate 76 to prevent leakage of microwave radiation from therebetween. The piston receiving aperture 161 formed in intermediate plate 76 is preferably sized just slightly larger than the diameter of the piston 156 and a quarter wavelength choke164 is preferably formed in or on the intermediate plate 76 to prevent microwave radiation from passing between the piston 156 and the intermediate plate 76. The quarter wavelength choke provides an electrically short-circuited current circuit even though the current passage is "physically" open. Also, even if the contact of the piston 156 with the plate 76 is imperfect, its influence on the transmission of power is minimized.

Figure 8:
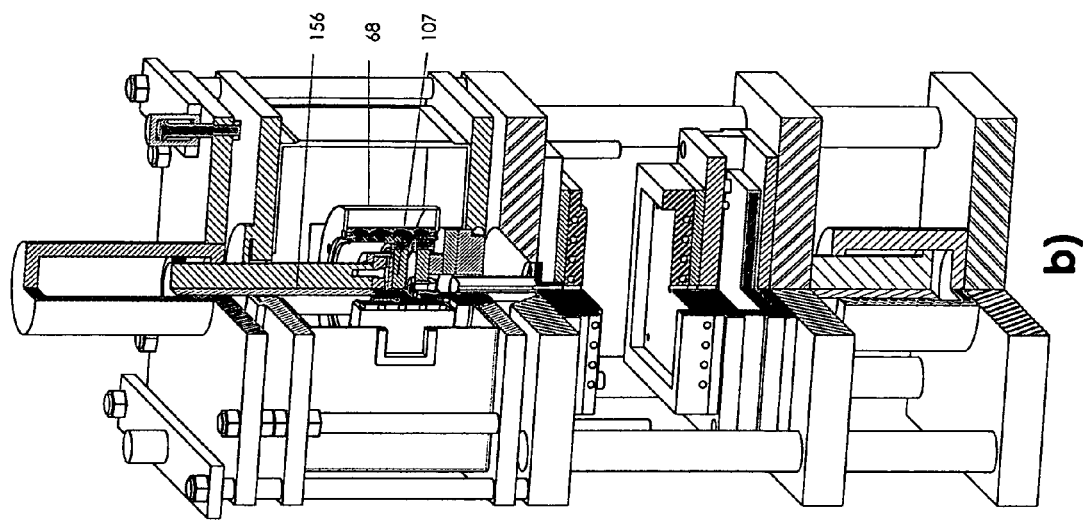
FIG. 8a is a perspective view of the molding machine as shown in FIG. 3, showing the piston of a hydraulic actuator, for use in ejecting molten plastic from the vessel, in a retracted extended position.
FIG. 8b is a view similar to FIG. 8a showing the piston of the hydraulic actuator in the fully extended position.
Figure 8:
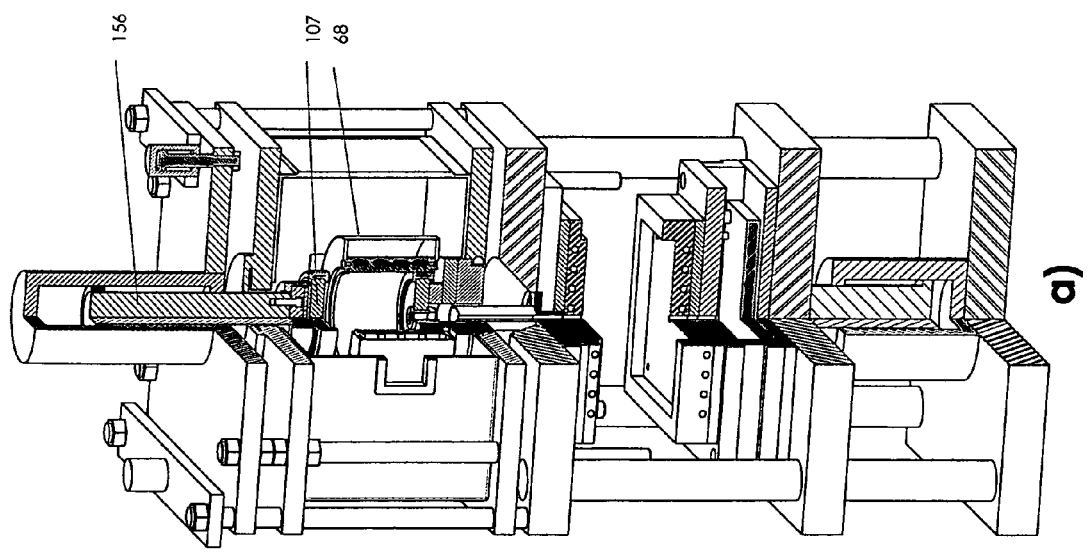

The piston 156 is selectively advanceable between a retracted position wherein the piston head 157 and locking collar 158 are spaced above the upper surface of the second or upper plunger 107 and an intermediate extended position in which the piston head 157 abuts against the upper surface of the upper plunger 107 of the plasticizing vessel 68. The piston 156 is further advanceable to a fully extended position wherein the upper plunger 107 is driven into engagement with the lower plunger 106. A lower portion 167 of the outer surface of locking collar 158 is threaded and sized for threaded engagement of the inner surface of the fourth lock ring 119 to permit connection of the locking collar 158 and piston 156 to the upper plunger 107 and its bushing 110. Connection of the piston 156 to the plunger 107 through its bushing 110 permits retraction of the plunger 107 upon retraction of the piston 156 from the fully extended position to the intermediate extended position or to the retracted position. In FIG. 8(a) the piston 156 and attached upper plunger 107 are shown in a fully retracted position and in FIG. 8(b) they are shown in a fully extended position upon completion of injection of the melt from the vessel 68. It is noted that the third lock ring 116 must be removed from the metal sleeve 101 prior to removal of the upper plunger 107 therefrom upon retraction of the piston 156 to the retracted position.

Figure 6:
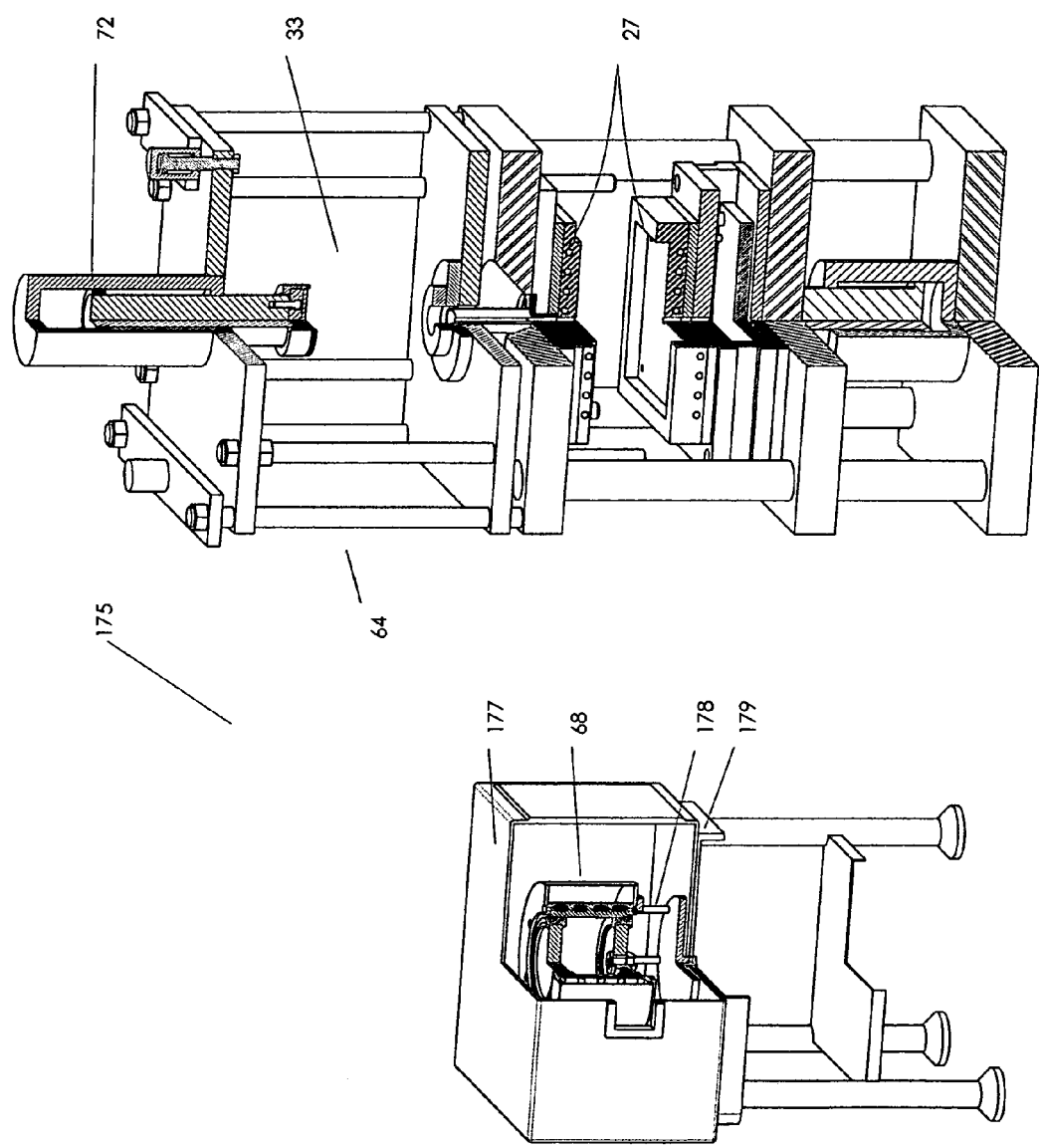
FIG. 6 is a perspective view of an alternative embodiment of a microwave injection molding system of the present invention with the microwave oven mounted on a separate stand and with portions broken away to show detail, including a heating vessel mounted in the microwave oven and transferable to the molding machine.

In the embodiment shown in FIG. 3, the microwave oven 66 and rotary device 70 are integrated into or mounted on the plasticizing unit subframe 64 above the mold 27. An alternative embodiment of a microwave injection molding system 175 is shown in FIG. 6, in which like elements are identified with the same reference numbers as the first embodiment 25. The primary difference between the embodiments is that the microwave oven 66 is not mounted on the plasticizing unit subframe 64. Rather, a separate microwave oven 177, similar to microwave oven 66 but without openings through the top and bottom panels, is mounted on a stand 179 apart from the injection assembly 33 and utilized for heating the plasticizing vessel 68 and plastic granules contained therein. Turntable 178 of microwave oven 177 is made of microwave transparent material, for example Ultem 1000. After heating of the polymer granules to their injection temperature in microwave oven 177, the plasticizing vessel 68 is transported from the microwave oven 177 to the subframe 64 (see FIG. 7), between the injection actuator 72 and the mold 27 so that the actuator 72 can be used to inject molten plastic from the plasticizing vessel 68 into the mold 27 as discussed in more detail hereafter.

The selection of materials for forming the plasticizing vessel 68 is disclosed in my U.S. patent application Ser. No. 10/868,574 published on Nov. 11, 2004 as Publication No. US-2004-0222554-A1, which is incorporated herein by reference. The materials and additives and their quantities used in forming the ceramic components of the plasticizing vessel 68 (corresponding to the mold in application Ser. No. 10/868,574) are selected to provide approximately equal heating rates of all of the members surrounding the plasticizing cavity 102, or inner plasticizing vessel members, including the plasticizing vessel sidewall 104 and top and bottom plungers 106 and 107 with their bushings 109,110 and locking rings 115,119. The controlling parameter for each inner plasticizing vessel member is the parameter which may be referred to as its thermosensitivity, $$\frac{\tan\delta}{\epsilon\, c\rho}.$$

The condition resulting in the equality of the heating rates of the inner plasticizing vessel members may be formulated in terms of their thermosensitivities:

$$\left[\left(\frac{\tan\delta}{\epsilon c\rho}\right) \times \frac{M_{ceramic}}{M_{total}}\right]_{top\ plunger} = \quad (1)$$

$$\left[\left(\frac{\tan\delta}{\epsilon c\rho}\right) \times \frac{M_{ceramic}}{M_{total}}\right]_{bottom\ plunger} = \left[\left(\frac{\tan\delta}{\epsilon c\rho}\right) \times \frac{M_{ceramic}}{M_{total}}\right]_{sidewall}$$

Where:
the subscripts "top plunger", "bottom plunger" and "sidewall" refer to properties of the
ceramic microwave absorbing material of these parts, respectively,
$\epsilon$=dielectric constant,
$\tan\delta$=dissipation factor,
c=specific heat,
$\rho$=density.
$M_{cermic}$=the mass of ceramic of respective plasticizing vessel member,
$M_{total}$=total mass of respective plasticizing vessel member.

When the mold materials, their additives and quantities are determined for each mold member, the ceramic parts of each mold member may be processed by conventional techniques. Such techniques generally comprise casting followed by sintering of the ceramic parts at elevated temperatures for improved mechanical strength.

As discussed previously, most thermoplastics exhibit relatively high dielectric losses at elevated temperatures. The heating rate of the plasticizing vessel members may be adjusted to approach that of the plastic material to be molded. This may be expressed in terms of the thermosensitivity of the materials:

$$\left(\frac{\tan\delta}{\epsilon c\rho}\right)_{work} = \left[\left(\frac{\tan\delta}{\epsilon c\rho}\right) \times \frac{M_{ceramic}}{M_{total}}\right]_{plasticizing\ vessel\ members} \quad (2)$$

Approximate equality of the heating rates given by equation (2) will result in relatively uniform heating of the inner plasticizing vessel members and the polymer work material or granules. Under these preferred conditions the heating time may be significantly reduced. Any imbalance in the heating rates of the inner plasticizing vessel members and plastic granules will require adjustments to reduce the non-uniformity of heating. Higher thermosensitivity of the plastic work material will cause overheating of its central zone. In the opposite case, the result will be overheating of the work material immediately adjacent the inner plasticizing vessel members. In either case, periodic interruption of the heating cycle will reduce existing thermal gradients in the plasticizing cavity 102 to minimize overheating of the work material.

The most efficient way to control the heating rates (thermosensitivities) of the inner plasticizing vessel members is to control the dissipation factor tan$\delta$ by adding selected amounts of highly conductive ceramic additives into the base ceramic material of the member. Aluminum oxide $Al_2O_3$ may be chosen as the base material and silicone carbide, SiC, as additive to increase the heating rate of the plasticizing vessel member. Aluminum oxide has very low dissipation factor while silicone carbide is highly conductive. The proportions of these materials maybe selected such that the resulting materials forming the inner plasticizing mold members approximately satisfy both conditions or equations (1) and (2).

Many of thermoplastics which may be molded in the molding system of the microwave molding system 25 and 175 of the present invention, are generally microwave transparent at ambient temperatures and only become microwave absorbent at elevated temperatures. The temperature at which the plastic becomes microwave absorbent may be referred to herein as the critical temperature. The critical temperature may be defined as the temperature at which the dissipation factor equals or exceeds 0.01–0.02, such that the material may be characterized as having high dielectric losses. In the book "Dielectric and mechanical relaxation in materials; analysis, interpretation, and application to polymers" by S. Havriliak, Jr and S. Havriliak; Hanser Publishers, Munich, Vienna, New York, 1997, pp. 1–9, it is shown that dielectric properties of polymers are directly related to their viscoelastic properties and ability of molecular dipoles to follow the time variable electric field. The increased mobility of polar molecules at elevated Although the work material may be heated in the plasticizing vessel 68 at temperatures below the critical temperature by conduction from the inner plasticizing vessel members heated by microwave radiation, such heating does not result in uniform heating of the work material and is not particularly efficient.

Figure 9:
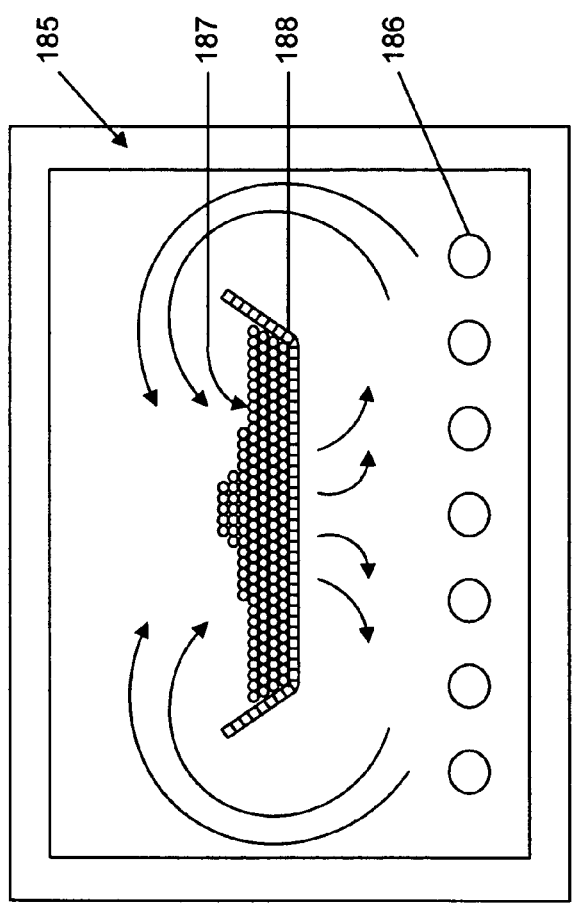
FIG. 9 is a schematic view of a conventional oven for use in preheating and drying plastic granules for further heating and injection in the microwave injection molding system.

A preferred method of preheating the work material or polymer granules utilizes conventional heating means, such as convection oven 185 utilizing gas burners or electrical heaters 186 with air circulation as shown schematically in FIG. 9. The polymer granules 187 are shown on the tray or conveyor belt 188 and may be preheated by such conventional means to or above the critical temperature. The granules may also be heated to the heat deflection temperature for the plastic, which corresponds to the temperature at which the plastic generally becomes pliable but not yet a liquid. For many engineering thermoplastics, the heat deflection temperature typically exceeds the critical temperature. For example, the heat deflection temperature of glass reinforced PEEK is 450° F. while the critical temperature is approximately 320° F. The heat deflection temperature at 264 psi, $T_{deflection}$, a glass-transition temperature $T_g$, melting point temperatures $T_{melt}$ and process temperatures $T_{process}$ of some crystalline and amorphous high performance thermoplastics for which the molding system of the present invention is particularly well adapted for processing are set forth in the following table:

|  | Ultem 1000 | Torlon 5530 | Ketron PEEK | Semitron ESd 420 | Celazole PBI |
|---|---|---|---|---|---|
| $T_{deflection}$, ° F. | 400 | 520 | 450 | 410 | 800 |
| $T_g$, ° F. | 419 | 527 | N/A | 428 | 750 |
| $T_{melt}$, ° F. | N/A | N/A | 644 | N/A | N/A |
| $T_{process}$, ° F. | 600 | 700 | 730 | 610 | 950 |

Figure 10:
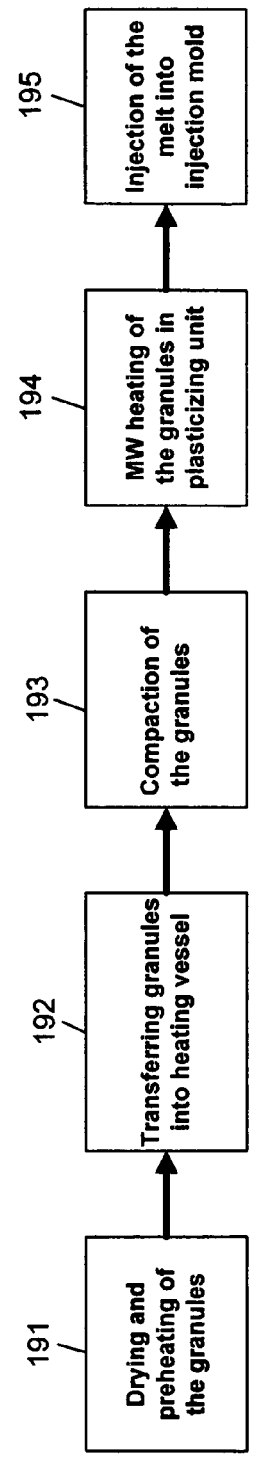
FIG. 10 is a schematic view of successive steps of the microwave molding process of the present invention.

After drying and preheating of the granules in the conventional oven 185 with air circulation, as shown schematically in FIG. 10 at 191, the granules are transferred to the plasticizing vessel 68 and poured by the gravity and/or by means of feeding tube into the plasticizing cavity 102 as shown at 192. Although not shown, it is foreseen that the preheated granules may be transferred to the plasticizing vessel 68 by various automated transfer means, including belt or screw conveyors. To prevent the temperature of the granules from dropping below the critical temperature upon placement in the plasticizing cavity 102, the plasticizing vessel 68 should be preheated to that temperature or above.

Referring to the embodiment shown in FIG. 3, at the beginning of a molding session, the plasticizing vessel 68 is placed on the rotary device 70 in the resonance cavity 87 of the microwave oven 66. The piston 156 is retracted to the upper position.

The door of the microwave oven 66 is closed and the microwave oven 66 is activated to heat the plasticizing vessel 68 to at least the critical temperature of the work material. The rotary device 70 may be activated to rotate the plasticizing vessel 68 during preheating and known temperature measuring means as such as thermocouples or pyrometers may be utilized to measure the temperature of the plasticizing vessel 68 or it may be heated for a period selected to reach the desired temperature.

While the plasticizing vessel 68 is being preheated, the mold members 46 and 48 positioned in abutting or closed relationship to form the mold cavity 50 are preheated by the linear cartridge heaters located in some of the channels 53 to a desired temperature, which provides for quality cavity filling without wrinkles or welding lines. The temperatures of the mold 27 and sprue bushing 52 must be determined by trial for each particular plastic material. A heating element (not shown) wrapped around the sprue bushing 52, or formed in sprue bushing 52 are activated to preheat the sprue extension member 145 to the desired temperature before injecting plastic therethrough.

After preheating of the plasticizing vessel 68 and the mold members 46 and 48, the piston 156 is extended to abut against the top plunger 107. The locking collar 158 is coupled to the fourth lock ring 119 on the top plunger 107, the third lock ring 116 is removed from the sleeve 101 and the piston 156 is retracted to withdraw the top plunger 107 from the plasticizing vessel 68 as shown in FIG. 8a. As discussed above, a first selected quantity of preheated plastic granules is transferred from the preheating assembly and poured into the plasticizing cavity 102 of the plasticizing vessel 68 in the microwave oven 66. The piston 156, with the upper plunger 107 connected thereto is extended until it engages and compresses the polymer granules in the plasticizing cavity 102 shown schematically at 193 in FIG. 10. A second quantity of preheated granules may be added into plasticizing cavity 102 and compacted as the first quantity to increase the shot capacity.

The locking collar 158 is then disconnected from the upper plunger 107 and the third lock ring116 is threadingly coupled to the upper end of the metal sleeve 101 of the plasticizing vessel 68. The piston 156 is retracted in to upper position. The microwave oven 66 and rotary device are then activated to subject the plasticizing vessel to microwave radiation to heat the granules contained therein as shown at 194 in FIG. 10. The microwave radiation heats the ceramic layer 103 and the ceramic plungers 106 and 107. Microwave radiation passing through the ceramic plungers 106 and 107 also heats the polymer granules maintained in the plasticizing cavity 102. The temperature of the plastic granules or work material may be monitored by a pyrometer (not shown) located outside of the microwave oven 66 either through the observation window of the microwave oven 66 or through a hole in one of its side walls (not shown). It also may be controlled by thermocouples during the interruption of heating cycle. Usually the temperature of the melt is controlled by settings of the heating time and of the power of microwave generator. The third lock ring 116 and lock ring 113 connected to the sleeve 101 prevent the upper and lower plungers 107 and 106 from being forced out of the sleeve 101 as the pressure due to heating of the plastic granules and trapped gasses increases.

Once the polymer granules are heated to the injection temperature of the work material, the microwave oven 66 and turntable 70 are turned off. The pistons 83 of hydraulic actuators are extended to engage nozzle 120 with sprue bushing 52 end to form continuous passage of the melt. The piston 156 is then extended until it first engages the upper plunger 107 and then further to force the molten work material out of the plasticizing cavity 102, through the nozzle 120, sprue bushing 52 and into the mold cavity 50 as shown in FIG. 8b and schematically shown at 195 in FIG. 10. Cooling agent is then circulated through the cooling tubes located in some of the channels 53 in the mold members 46 and 48 until the plastic in the mold cavity 50 cools to the point where it retains the shape of the mold cavity 50. The locking collar 158 on piston 156 is then coupled to the upper plunger 107 and the third lock collar removed from the sleeve 101 so that the upper plunger 107 may be pulled out of the plasticizing vessel 68 by retraction of the piston 156.

An annular spacer (not shown) may be positioned around the piston 156 between the top of the plasticizing vessel 68 and the bottom of the microwave oven top panel 90 with a small gap of approximately ¼ an inch. As the piston 156 is initially retracted, the plasticizing vessel 68 is lifted off of the turntable 70, due to the friction between the plunger 107 and sleeve 101, separating the hardened plastic in the nozzle 120 from the plastic in the sprue bushing 52. Once the vessel 68 is raised enough to close the gap between the spacer and microwave oven top panel 90, the upward movement of the vessel 68 is prevented and the upper plunger 107 is then withdrawn therefrom. Upon separation of the plunger 107 from the vessel 68, the vessel drops the short distance back down onto the turntable 70.

The mold members 46 and 48 are then separated. The connection formed between the part puller 56 and the molded part separates the molded part from the upper mold member 46. The hardened plastic in the sprue 51 is typically pulled out of the sprue 51 with the molded part as it is separated from the upper mold member 46. The ejector pin assembly 57 is then activated to advance the ejector pins 58 into the portion of the mold cavity formed by the lower mold member 48 to separate the molded part from the lower mold member 48. The ejector pins 58 are then retracted, the mold members 46 and 48 are advanced to the closed position to form the mold cavity 50 and the process is repeated for another mold cycle.

In the successive cycles, the plasticizing vessel 68 generally does not have to be preheated as it is sufficiently insulated to keep the inner plasticizing vessel members at a temperature above the critical temperature for the work material. However, because they were cooled to allow the molded part to solidify, the upper and lower mold members 46 and 48, along with the sprue bushing 52 are preferably reheated to a desired temperature as described above.

It is foreseen that prior to injection of the molten work material, the upper and lower mold members 46 and 48 may be positioned in a slightly spaced apart or open position. Upon injection of the molten work material into the cavity 50, the lower mold member 48 may be advanced toward the upper mold member 46 to provide improved flow of the molten work material into all portions of the cavity 50. This process is generally referred to as injection-compression molding (ICM). Using the ICM process the injection pressure can be reduced and the flow characteristics may be improved. ICM allows minimal shrinkage, warping, and residual stress, resulting in a more dimensionally stable part.

Figure 7:
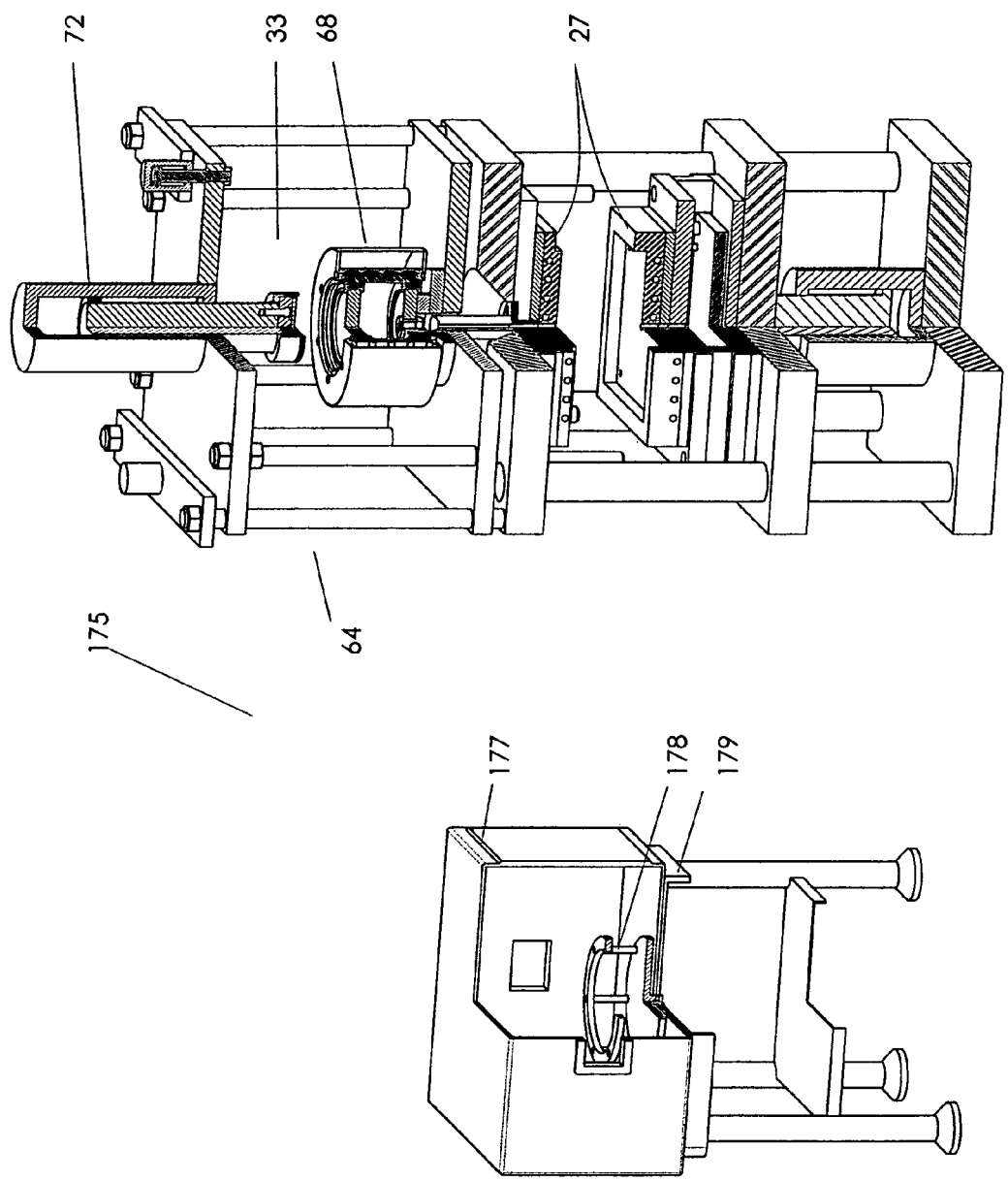
FIG. 7 is a perspective view of the alternative embodiment of the microwave injection molding system of the present invention with the heating vessel transported from the stand alone microwave oven into an injection assembly and with portions broken away to show interior detail.

An injection molding system utilizing microwave energy for heating and molding of thermoplastics was built similar to the alternative embodiment 175 shown in FIG. 6 and FIG. 7. A T-150 model, Cincinnati Milacron injection molding machine was used as a base for this system. Since the machine normally operates in a horizontal orientation, the injection assembly 33 as shown in FIG. 6 and FIG. 7 was oriented horizontally instead of vertically. The plasticizing unit of this machine containing a barrel and screw was removed and replaced with a plasticizing unit similar to plasticizing unit 31 described above. The clamping force of this machine is 150 ton and is enough for molding parts with a projected area 12"×12". A 6 kW microwave system operating at 2.45 GHz made by Cober Electronics was used as the microwave oven 177 shown in FIG. 6 and FIG. 7. This system contains a microwave generator unit and stand alone batch microwave applicator with a resonance cavity having dimensions of 28"×28"×20". The generator unit and applicator are connected by a waveguide for transmission of microwave energy from the magnetron of the generator into the resonance cavity of the applicator. The applicator includes one launch port, a mode stirrer, and a turntable. The inner diameter of the plasticizing vessel is 7" and its cavity height is 5" which corresponds to a capacity of 192 cubic inches. The total length of plasticizing vessel is 8". The shot capacity of original T-150 injection machine was 8 ounces and after modifications the shot capacity increased approximately ten times while reducing the length of the plasticizing unit. This microwave system was used for molding 12"×12"×0.5"plates from pellets of high performance engineering thermoplastics such as Torlon 5030, PEEK CF 30 and Ultem 1000. Molded parts made by the use of microwave energy and injection molding exhibited improved mechanical properties and dimensional stability in comparison with compression molded parts.

It is to be understood that while certain forms of the present invention have been illustrated and described herein, it is not to be limited to the specific forms, process steps or arrangement of parts described and shown and that the invention should be limited only by the claims. For example, as discussed in the case of the prototype noted above, the injection assembly and mold members may be oriented horizontally instead of vertically. It is also to be understood that as used in the claims, reference to the circumferential wall and the first and second end members of the plasticizing vessel being formed from microwave absorbing ceramic materials is intended cover situations wherein each of these components or members are formed from the same microwave absorbing ceramic material or different microwave absorbing ceramic materials or any combination thereof.

What is claimed is:

1. An injection molding process comprising the steps of:
   a) providing a plasticizing vessel comprising a circumferential wall and first and second end members wherein said first end member has an outlet opening formed therein and said second end member is advanceable toward and away from said first end member; at least a portion of said plasticizing vessel being formed from microwave absorbing material to allow heating of said plasticizing vessel by microwave energy;
   b) filling at least a portion of said plasticizing vessel with granules of a selected polymer;
   c) positioning said plasticizing vessel within a resonance cavity of a microwave oven and exposing said plasticizing vessel and said granules therein to a sufficient amount of microwave energy to heat said plasticizing vessel and said granules of the selected polymer to an injection temperature of the selected polymer;
   d) forcing said selected polymer heated to said injection temperature out of said plasticizing vessel and into a mold cavity of a mold.

2. The injection molding process as in claim 1 wherein said step of filling at least a portion of said plasticizing vessel, comprises filling at least a portion of said plasticizing vessel with granules of the selected polymer preheated to a critical temperature for the selected polymer at which the polymer becomes microwave absorbent.

3. The injection molding process as in claim 1 wherein said step of filling at least a portion of said plasticizing vessel, comprises filling at least a portion of said plasticizing vessel with granules of the selected polymer preheated to a heat deflection temperature for the selected polymer.

4. The injection molding process as in claim 1 wherein between the filling and exposing steps the process further comprises the step of compacting the granules in said plasticizing vessel by advancing the second end member toward said first end member with said granules positioned therebetween.

5. The injection molding process as in claim 1 wherein said circumferential sidewall and said first and second end members are formed at least in part by microwave absorbing materials formulated such that said circumferential sidewall and said first and second end members have approximately equal thermosensitivities.

6. The injection molding process as in claim 1 wherein said circumferential sidewall and said first and second end members are formed at least in part by microwave absorbing materials formulated such that said circumferential sidewall and said first and second end members have a thermosensitivity equal to the thermosensitivity of the selected polymer.

7. An injection molding process comprising the steps of:
   a) preheating a quantity of a selected polymer to a temperature at which the selected polymer becomes microwave absorbent;
   b) placing the selected polymer in a plasticizing vessel comprising a circumferential wall surrounding a plasticizing cavity; said plasticizing vessel having a first end member closing off a first end of said plasticizing cavity and a plunger advanceable through a second end in said plasticizing cavity toward and away from said first end member; said circumferential wall and said first and second end members being formed at least in part from microwave absorbing materials and said first end member having an injection nozzle connected thereto;
   c) positioning said plasticizing vessel within a resonance cavity of a microwave oven and exposing said plasticizing vessel and said granules therein to a sufficient amount of microwave energy to heat said plasticizing vessel and said granules to an injection temperature of the selected polymer;
   d) advancing said plunger toward said first end member to force said molten polymer out of said plasticizing vessel through said nozzle and into a mold cavity of a mold.

8. The injection molding process of claim 7 wherein said preheating step comprises heating said granules to a heat deflection temperature of the selected polymer.

9. The injection molding process as in claim 7 wherein between said placing and exposing steps the process further comprises the step of advancing said plunger toward said first end member to compress the granules in said plasticizing cavity and maintaining the granules in a compressed state during the exposing step.

10. The injection molding process as in claim 7 wherein said microwave absorbing materials used to form at least a portion of said circumferential wall and said first and second end members are formulated such that said circumferential wall and said first and second end members have approximately equal thermosensitivities.

11. The injection molding process as in claim 7 wherein said microwave absorbing materials are formulated such that said circumferential sidewall, and said first and second end members have a thermosensitivity equal to the thermosensitivity of the selected polymer.

12. An injection molding system utilizing microwave energy for heating of polymer material to its injection temperature comprising:
   a) a mold press including a mold assembly having at least two mold members moveable between open and closed positions and forming a mold cavity when advanced to the closed position;
   b) a plasticizing vessel comprising a circumferential wall and first and second end members wherein said first end member has an outlet opening formed therein and said second end member is advanceable toward and away from said first end member; said plasticizing vessel sized to receive a quantity of granules of a polymer to be molded into a part in said mold cavity;
   c) a microwave oven sized to receive said plasticizing vessel and operable to heat said plasticizing vessel and said granules received in said plasticizing vessel to an injection temperature to produce a polymer melt;
   d) an injection assembly connected to said mold press and adapted to receive said plasticizing vessel, said injection assembly having an actuator selectively advanceable into engagement with said second end member of said plasticizing vessel and operable to drive said second end member of said plasticizing vessel toward said first end member to force said polymer melt out of said plasticizing vessel and into said mold cavity.

13. The injection molding system as in claim 12 wherein said microwave oven is incorporated into said injection assembly between said actuator and said mold press, said microwave oven having an actuator receiving opening formed through a first side thereof through which said actuator may extend to engage said second end member of said plasticizing vessel; said microwave oven having an injection opening formed on a side opposite of the actuator receiving opening through which said polymer melt may be ejected from said plasticizing vessel and into said mold cavity.

14. The injection molding system as in claim 12 wherein said circumferential sidewall comprises an inner metal sleeve and a layer of microwave absorbing ceramic material surrounding said inner metal sleeve and at least a portion of said first and second end members are formed from microwave absorbing ceramic materials; said circumferential sidewall and said first and second end members each have an approximately equal thermosensitivity such that exposing said plasticizing vessel to microwave radiation in said microwave oven results in relatively equal heating rates of each of said circumferential sidewall and said first and second end members; wherein the thermosensitivity of said circumferential sidewall and each of said first end second end mold members is equal to the dissipation factor of the microwave absorbing ceramic material divided by the product of its dielectric constant, density and specific heat and multiplied by the ratio of the mass of the microwave absorbing ceramic material over the total mass of the respective sidewall or end member.

15. An injection molding system utilizing microwave energy for heating plastic material to its injection temperature comprising:
   a) a mold press including a mold assembly having at least two mold members moveable between open and closed positions and forming a mold cavity when advanced to the closed position;
   b) a plasticizing vessel comprising a circumferential wall and first and second end members defining a plasticizing vessel chamber; wherein said first end member has a nozzle with an outlet opening formed therethrough extending outward from said first end member in flow communication with said plasticizing vessel chamber; said second end member is advanceable toward and away from said second end member; at least a portion of said plasticizing vessel being formed from microwave absorbing material to allow heating of said plasticizing vessel by microwave energy; said plasticizing vessel chamber sized to receive a quantity of granules of a polymer to be molded into a part in said mold cavity;
   c) a plasticizing unit frame movably mounted relative to said mold press;
   d) an injection actuator selectively advanceable into engagement with said second end member of said plasticizing vessel and operable to drive said second end member of said plasticizing vessel toward said first end member;
   e) a microwave oven mounted on said plasticizing unit frame and having a microwave oven chamber sized to receive said plasticizing vessel; said microwave oven operable to heat said plasticizing vessel and said granules received in said plasticizing vessel chamber to an injection temperature to produce a plastic melt; said microwave oven having an actuator receiving opening formed through a first side thereof through which said actuator may extend to engage said second end member of said plasticizing vessel; said microwave oven having an injection opening formed in an opposite side of the actuator receiving opening through which said nozzle may extend for flow connection of said plasticizing vessel to said mold assembly.

16. The injection molding system of claim 15 further comprising a plasticizing frame actuator for advancing said plasticizing frame and said plasticizing vessel mounted thereon between retracted and extended position, wherein when said plasticizing frame is in said retracted position said nozzle is flow separated from said mold assembly and when said plasticizing frame is advanced to said extended position, said nozzle is flow connected to said mold assembly.

17. The injection molding system as in claim 16 wherein said plasticizing vessel is rotatably mounted within said microwave oven.

18. The injection molding system as in claim 15 wherein said circumferential sidewall comprises an inner metal sleeve and a layer of microwave absorbing ceramic material surrounding said inner metal sleeve and said first and second end members are formed from microwave absorbing ceramic materials; said circumferential sidewall and said first and second end members each have an approximately equal thermosensitivity such that exposing said plasticizing vessel to microwave radiation in said microwave oven results in relatively equal heating rates of each of said circumferential sidewall and said first and second end members; wherein the thermosensitivity of said circumferential sidewall and each of said first end second end mold members is equal to the dissipation factor of the microwave absorbing ceramic material divided by the product of its dielectric constant, density and specific heat and multiplied by the ratio of the mass of the microwave absorbing ceramic material over the total mass of the respective sidewall or end member.

* * * * *